July 15, 1958 R. J. WISE ET AL 2,843,756
OPTICAL SCANNING APPARATUS FOR FACSIMILE TRANSMITTERS
Original Filed June 12, 1946 2 Sheets-Sheet 1

INVENTORS
R. J. WISE
G. H. RIDINGS
BY
A. A. Thomas
ATTORNEY

INVENTORS
R. J. WISE
G. H. RIDINGS
BY A. A. Thomas
ATTORNEY

United States Patent Office 2,843,756

Patented July 15, 1958

2,843,756

OPTICAL SCANNING APPARATUS FOR FACSIMILE TRANSMITTERS

Raleigh J. Wise, Arlington, and Garvice H. Ridings, Summit, N. J., assignors to The Western Union Telegraph Company, New York, N. Y., a corporation of New York Original application June 12, 1946, Serial No. 676,180. Divided and this application July 6, 1951, Serial No. 235,496

2 Claims. (Cl. 250—210)

This invention relates to facsimile transmitters and its object is to provide optical scanning apparatus of improved operation and increased efficiency.

One feature of our invention comprises an amplifying network designed to invert the signals by the use of two photocells arranged to be exposed simultaneously to the light of an exciter lamp.

One of these cells, called the signal cell, is excited by the variable scanning beam, and the other or balancing cell receives a definite quantity of light independently of the scanned record. These two cells are exposed simultaneously to the interrupted of pulsating light that passes through the chopper disk. Consequently, the cells always operate in phase and are connected in a bridge circuit which controls the output of the network connected across the bridge. This network is so constructed that its output circuit is energized only by signals resulting from the unequal excitation of the two photocells during the scanning of black or marked areas on a copy sheet. When the white background of a copy is being scanned, the output circuit of the network is inactive. In this way the amplifying network controlled by the two photocells acts as an automatic signal inverter to produce a positive facsimile of the transmitted copy. In a preferred form of our invention we use an adjustable polarizing device for the balancing photocell to obtain a correct balance of intensities between the two cells during the scanning of copy background, so that no signals shall pass through the network during such intervals.

The phase arrangement of the two cells in our invention obviates certain mechanical difficulties inherent in prior signal inversion systems where the two photocells operated 180° out of phase. It was necessary in those prior devices to mount the two cells in such positions relative to the chopper disk that, when one cell received light through a slot of the disk, the other cell was optically cut off by a tooth of the disk. Such an arrangement of the photocells required a critical adjustment which would be disturbed the moment that the fast revolving disk began to wobble, even slightly. This objectionable feature is wholly absent in our signal inverter because both cells are always exposed to the same conditions of excitation from the exciter lamp, even if the chopper disk should deviate from its original adjustment.

Another feature of our invention comprises a novel scanning method and mechanism in which an exciter lamp with an incandescent metallic cathode point of high luminosity is so combined with a lens assembly as to produce a scanning spot of the required dimensions without the usual aperture plate necessary in prior optical scanners to define the scanning spot. In our new scanning system the exact form and size of the scanning spot are determined solely by means of the lens assembly interposed between the point source of light and the surface to be scanned. By using the proper lenses and adjusting their position in the optical field, we can project any desired image of the incandescent cathode point onto the scanning surface. For best results we generally use a round or square spot of light having the width of a scanning line. As will appear later, our novel scanning system operates at higher efficiency than prior schemes of that kind.

The foregoing and other features of novelty that characterize our invention will be fully set forth in a description of the accompanying drawings in which.

Figure 1:
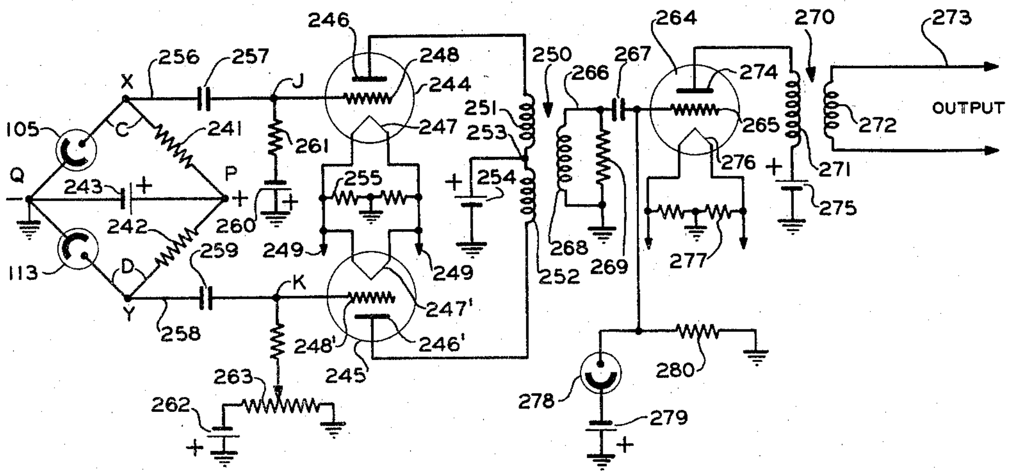
Figs. 1 and 2 show two forms of network controlled by two photocells in our optical scanning system for inverting and amplifying the signals.

We are to assume that the signal inverting and amplifying network of our invention is applied to a facsimile transmitter with optical scanning mechanism in which a photocell 105 is arranged to receive a scanning beam reflected from the scanned area of a message sheet. The scanning beam comes from an exciter lamp (not shown in Figs. 1 and 2) and is reflected to the photocell 105 through a motor driven chopper disk which generates the required signal frequency. This is standard practice and will be understood without further explanation.

A second photocell 113 is arranged to receive a steady beam from the exciter lamp independently of the scanning beam that goes to the photocell 105 from the scanned copy sheet. As we shall explain later, the intensity of the light beam to cell 113 is so regulated that its effect balances the effect of the scanning beam on cell 105. For the sake of distinction let us call 105 the signal cell and 113 the balancing cell.

Figure 2:
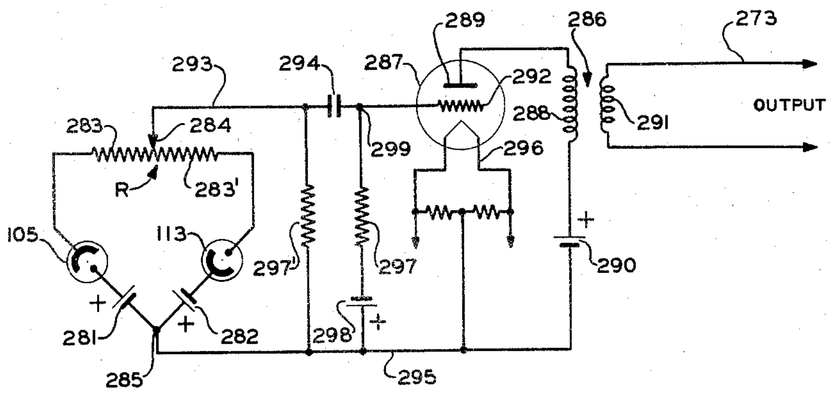

The two photocells 105 and 113 are connected in a Wheatstone bridge network, two forms of which are shown in Figs. 1 and 2. Referring to Fig. 1, a pair of resistors 241 and 242 are connected in series with cells 105 and 113, respectively, to form the parallel arms or branches C—D of the bridge. The junction points P—Q of the bridge are connected to opposite sides of a source of direct current potential indicated by the battery 243, the negative terminal of which is grounded. The resistors 241 and 242 have a fixed ohmic value and that is also true of the resistance of cell 113 because it is subject to the unmodified constant light of the exciter lamp. However, the signal cell 105 acts as a variable resistance which is highest when the black areas on the message sheet are being scanned. The ohmic values of resistors 241 and 242 are so adjusted that when the copy background is being scanned and the two photocells receive maximum (though not necessarily equal) excitation, the points X and Y are at the same potential.

Two vacuum tubes 244 and 245 are connected in what is called a push-pull arrangement. The tube 244 has a plate 246, a filament 247 and a grid 248, and the other tube 245 has three similar elements 246', 247' and 248', respectively. The filaments 247 and 247' are connected in parallel to a source of heating current indicated by arrows 249. A transformer 250 has a primary coil consisting of two equal sections 251—252 which are connected at the middle point 253 to the plus side of a battery 254. The negative side of this battery is grounded and the return circuit is completed through a grounded resistor 255 connected across the filaments 247—247'.

The grid 248 of tube 244 is connected to point X of the bridge by a line 256 in which a condenser 257 is inserted, and likewise the grid 248' of tube 245 is connected to point Y by a line 258 through an interposed condenser 259. A battery 260 has its negative pole connected to line 256 through a fixed resistor 261, the positive pole of the battery being grounded. Similarly, the negative pole of a battery 262 is connected to line 258 through a potentiometer 263, the battery being grounded at the positive pole. It is clear that the battery 260 imposes a fixed negative bias on the grid 248 and the battery 262 puts a constant negative bias on grid 248'. The potentiometer 263 permits adjustment of the bias voltage on grid 248', so that the two opposed tubes can be correctly balanced for the scanning of the white background of the message sheets.

A third vacuum tube 264 has its grid 265 connected to a line 266 which has a condenser 267 and goes to one side of the secondary coil 268 of transformer 250. The other side of the coil 268 is grounded and a resistor 269 is shunted across the coil to reduce the voltage on grid 265. A step-down transformer 270 has a primary coil 271 and a secondary coil 272 which is connected to the output circuit 273. One side of the primary coil 271 goes to the plate 274 of tube 264 and the other side of the coil is connected to the positive pole of a battery 275, the negative pole of which is grounded. The return circuit of plate battery 275 is through the filament 276 and a grounded resistor 277 connected across the filament.

In some cases we may also use a third photocell 278, which is directly exposed to the exciter lamp for a purpose that will presently appear. The positive electrode of this cell is connected to line 266 between the condenser 267 and the tube 264. The negative pole of a battery 279 is connected to the sensitive electrode of photocell 278, and the positive side of the battery is grounded. A resistor 280 may be connected in shunt to the grid 265 in order to reduce the potential from battery 279.

The electronic inverter and amplifier of Fig. 1 operates in this way: When the white background of a sheet is being scanned, the two photocells 105 and 113 (which always operate in phase) receive maximum excitation and the cross connection points X and Y are at the same potential. Consequently, the grids 248 and 248' are balanced and the opposing currents in the two primary coils 251—252 of transformer 250 are equal, so that the transformer is inactive and no signals pass to the transmission line 273.

Now, suppose that a black area on a message sheet is being scanned. The signal cell 105 receives minimum excitation while that of the balancing cell 113 remains unchanged. The resulting increased resistance in the branch circuit C unbalances the bridge and the point X is at a higher potential than the point Y. This potential difference unbalances the grid 248—248' so that a corresponding current flows through the transformer 250. The condensers 257 and 259 pass only the alternating current signals and block all battery current. The junctions J and K are the points where the variable signal voltage at X and Y is superimposed on the steady negative grid bias from batteries 261 and 262, and the resultant voltage curve is impressed on the grids 248 and 248'.

The signal impulses that activate the transformer 250 are amplified by the tube 264 and pass through the output line 273 to the connected recorder where a positive replica or facsimile of the transmitted message is recorded. This will be understood without further explanation.

It may sometimes happen that the exciter lamp is connected in a circuit which is not stable so that the beam of the lamp would fluctuate. If these fluctuations were not compensated for, an imperfect transmission would result. To guard against this contingency, we connect the extra photocell 278 to the grid 265 of amplifier tube 264. The battery 279 imposes a negative bias on grid 265 through the cell 278. As long as the exciter lamp remains steady, the bias on grid 265 is constant. If, however, the lamp should dim, the resistance of the electron path in photocell 278 increases and there is a corresponding decrease in the negative potential on grid 265. Therefore, the plate current in tube 264 increases to produce a corresponding increase in the output of transformer 270. Conversely, should the exciter lamp grow brighter, the negative bias on grid 265 increases to cut down the plate current. In this manner, the photocell 278 acts as a volume control in the amplifier output.

Fig. 2 shows a simpler form of network utilizing the two photocells 105 and 113 to invert and amplify the signal impulses before they reach the output lines 273. In this modification we provide a bridge circuit in which one branch or arm contains the signal cell 105, a battery 281 and a resistor 283, and the other branch contains the balancing cell 113, a battery 282 and a resistor 283'. The elements in each branch are connected in series between the opposite points 284 and 285. The two resistors preferably constitute a single resistance device R and the connecting point 284 is an adjustable tap between the resistor sections 283—283'. The point 284 is so chosen that during the scanning of copy background the two branches of the photocell circuit are electrically symmetrical, so that the points 284 and 285 are at equal potential.

The points 284 and 285 of the photocell circuit are connected to an output transformer 286 through an amplifier tube 287. The primary coil 288 of the transformer is connected at one side to the plate 289 of tube 287 and at the other side to the positive pole of a battery 290. The secondary coil 291 of transformer 286 goes to the output circuit 273. The grid 292 of tube 287 is connected to the resistor tap 284 by a line 293 which contains a condenser 294. The point 285 of the photocell circuit is connected to a conductor 295 which may be considered as representing common ground for the various parts connected thereto. The filament 296 of tube 287 is connected to conductor 295 which goes to the negative side of the plate battery 290. Two resistors 297 and 297' are connected across the lines 293 and 295 on opposite sides of condenser 294. A battery 298 in series with the resistor 297 imposes a steady negative bias on grid 292.

The tap 284 at or near the middle of resistor R represents the electrical center of the photocell circuit. When both cells 105 and 113 receive maximum excitation from the lamp, as when the white background of a message sheet is being scanned, the two halves of the circuit are symmetrical and there is no change in potential at the center tap 284. Consequently, only the steady plate current flows through the primary coil 288 of transformer 286, which therefore remains inactive.

When a black mark or area on a message sheet is being scanned, the diminished excitation of photocell 105 shifts the electrical center of the circuit so that the potential at point 284 changes. These potential variations cause signal impulses to be sent over line 293 to grid 292 of tube 287. The variable signal potential meets the fixed negative grid bias at the junction point 299 in line 293 and the resultant voltage is impressed on the grid, whereby the output transformer is energized to transmit the inverted amplified signal impulses over the output line 273.

*Optical scanning with a point source of light (Fig. 3)*

In the description of Figs. 1 and 2 we have assumed that the exciter lamp for the photocells 105, 113 and 278 is of the conventional filament type. However, there are certain drawbacks in a filament lamp for facsimile scanning.

The source of light in a filament lamp is without definite form and to produce a minute scanning spot therefrom requires not only reducing lenses but also an aperture plate or screen. There are two ways of placing this aperture in the light beam. According to one method, the apertured screen is placed near the filament lamp to receive a flood of light and the aperture blocks out all light except a minute fraction of it which is transmitted to the copy and forms the scanning spot. In other instances (see, for example, our Patent 2,262,715) the light is projected onto the copy in a flood beam which illuminates a considerable area of the paper and an image of this large path of light is then thrown against the apertured screen which allows only a small beam of scanning size to reach the photocell.

But even after a scanning spot has been thus obtained from a filament lamp, several undesirable conditions remain. Since the aperture plate only picks up a very small spot on the glowing filament, the lamp has to be carefully adjusted so that a section of the filament is imaged centrally on the aperture plate. This adjustment is critical and the least vibration of filament will throw the picked-up light spot out of the field. In other words, the filament spot for scanning use is not only hard to find but hard to keep. Then, too, since most of the light that strikes the scanning surface is lost by reflection, the photocell of the system receives but the merest fraction of the large filament source of light. In consequence the efficiency of the scanning operation is lowered to a degree where unsatisfactory results are obtained, especially in transmitting poor copy, such as telegrams written in faint pencil which are frequently encountered in commercial facsimile practice.

It will be clear from the foregoing that in scanning methods employing a large source of light the size and shape of the scanning spot are determined solely by the interposed aperture plate, which is an indispensable element of those systems. This reduction and restriction of the flood light coming from the filament lamp are a sheer waste of light and may lower the efficiency of the system to the point of unsatisfactory operation. Moreover, the reducing lenses and the aperture plate, together with the labor necessary for their assembly and critical adjustment, add to the cost of the apparatus.

To overcome the objections and disadvantages inherent in optical scanning methods with a filament lamp, we have devised a novel scanning system and apparatus whereby an image of a stable well-defined and intensely brilliant point source of light is projected by a lens assembly directly onto the surface to be scanned without the usual aperture plate. The shape and size of the scanning spot are determined solely by the lens assembly so that practically the entire point source of light is utilized with correspondingly high efficiency of operation.

Figure 3:
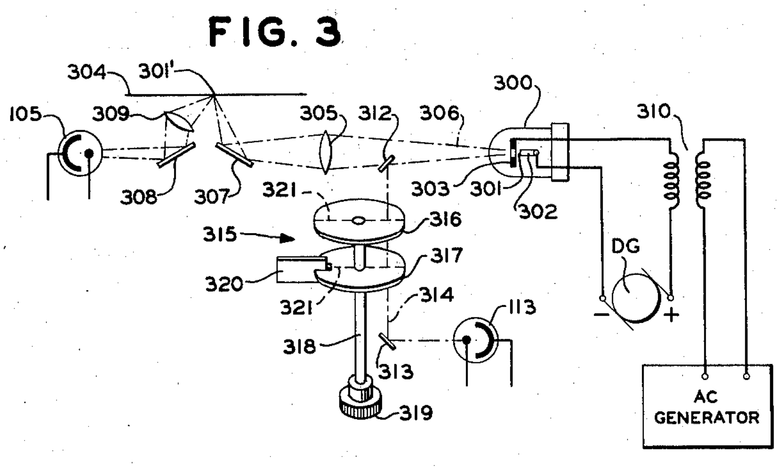
Fig. 3 shows schematically an arrangement for activating the two photocells of Figs. 1 and 2 from a cathode point source of light, with polaroid means to regulate the light beam for the balancing cell.

In Fig. 3, the scanning light is supplied by an arc lamp 300 adapted to produce an intense point source of light which is indicated for simplicity of illustration as a dot 301. For the purposes of this description we have assumed the lamp 300 to be like the electric space discharge device which forms the subject matter of a pending application of William D. Buckingham and Clarence R. Deibert, Serial No. 668,092, filed May 8, 1946 now Patent No. 2,453,188 as a continuation-in-part of their application Serial No. 501,052, filed September 3, 1943, now abandoned which may be referred to for the structural details of the lamp.

It is sufficient to say here that the lamp 300 has two electrodes 302 and 303 which are connected in the circuit of a direct current generator DG. As explained in the Buckingham and Deibert application, the cathode 302 has a thin core of a special metallic filling and the anode 303 has a circular opening arranged centrally of the core. When the lamp is in operation, an arc is formed between the electrodes around the anode opening and the minute tip of the cathode core becomes incandescent, thus forming an intensely concentrated spot of light which passes through the anode opening. The incandescent tip of the cathode core constitutes the point source of light 301 which has a luminosity of an extremely high order, such as between 10,000 and 50,000 candle power per square centimeter of cathode core surface.

Let it be understood that the relatively large opening in the ring-shaped anode 303 is not an aperture to restrict or define the beam of light point 301, which passes freely through the anode opening for use in our scanning system. We have then a source point of light which is a well-defined concentrated spot of extreme brilliance and absolutely stable in position.

To project the light point 301 onto the copy sheet 304 (suitably supported for scanning) we need only a small lens 305 located in the beam 306 of the lamp. The lens 305 represents any practical lens assembly for projecting an image of the light point 301 to form the scanning spot 301' on the sheet 304. This projecting process is done without the usual light-wasting aperture which is necessary with a large source of light like a filament lamp, as previously explained. What we do is to project an image of the point source 301 onto the copy, so that the scanning spot 301' has the same form as the light point 301 which may be round, square or rectangular, depending upon the incandescent tip surface of the cathode core.

The exciter beam 306 is reflected to the copy sheet 304 by a mirror 307, and a second mirror 308 receives the scanning beam from the sheet through a lens assembly 309 and reflects it to the signal cell 105. It will be understood that the optical elements 307, 308 and 309 represent schematically any practical system for directing the scanning beam to the photocell 105.

The size of the scanning spot 301' may be exactly the same as the point source 301 or it may be slightly amplified or reduced. For example, if we use 100 scanning lines to the inch and if the light point 301 has a diameter of ten mils, the projection of the light from the point source 301 to the scanning point 301' on the paper will be in a 1:1 ratio. This means that a full image of the brilliant light spot 301 will form the scanning spot 301' with substantially undiminished brilliance. In this 1:1 projection the location of lens 305 will be midway between the two points 301 and 301'. If the light point 301 is so small (say 4 mils in diameter) as to require enlarging for the scanning spot, the lens 305 is located nearer to point 301, and vice versa where the scanning image of the light point needs to be slightly reduced. In any case we utilize the light energy of point 301 with maximum efficiency and obtain a scanning spot of greater brightness than in any prior system. Consequently, even with the usual loss of light by reflection, the photocell 105 receives ample light for the satisfactory transmission of all copy, good or poor. Also, this higher signal strength requires less amplification.

The important differences between our scanning system with a point source of light and prior systems utilizing a filament lamp or other large source will now be apparent and may be summarized in this way. Where a filament lamp is used, the size and form of the scanning spot are determined solely by the dimensions of the aperture in the screen placed somewhere in the optical path between the lamp and the photocell. This apertured screen, which allows but a small fraction of the light to be used and wastes the rest, is an indispensable element of those prior systems. In contrast to that, our system requires no restricting aperture and the scanning spot 301' projected onto the copy is an image of the light spot 301. In our system, the form and size of the scanning spot depend wholly upon the character and position of the lens assembly 305. The arc lamp 300 is intended to represent broadly any practical lamp adapted to produce a brilliant concentrated point source of light for facsimile scanning.

The arc lamp 300 can be modulated to create a carrier of desired frequency. In Fig. 3, this modulation is produced by an A. C. generator (such as a vacuum tube oscillator) which is connected with the D. C. lamp circuit through a transformer 310, whereby the frequency of the generator is impressed upon the steady current of the lamp circuit. In this way the lamp 300 becomes a source of pulsating light having a high frequency suitable for scanning. This arrangement dispenses with the chopper disk for photocell 105 and thus eliminates the mechanical difficulties and limitations incident to the use of such a disk. For example, high carrier frequencies not possible with a chopper disk are easily obtained with the combination of the D. C. lamp 300 and the A. C. generator. If desired in certain cases, the light from lamp 300 may be steady and the carrier introduced into the transmission system by any one of the well-known methods.

When we say that in our new scanning system the light point 301 is projected directly onto the paper to form the scanning spot, we mean that this projecting process does not go through a light restricting aperture anywhere in the optical path to define the scanning spot, as in prior systems. The use of reflecting mirrors such as 307 and 308 is merely a mechanical convenience, for the mirrors perform no function in determining the size or brilliance of the scanning spot. Therefore, irrespective of any mirrors or prisms that may be used in our system, the point source of light is always projected directly onto the surface to be scanned.

In the illustrative embodiment of our scanning system as set forth in Fig. 3, we have assumed that this system is to operate in conjunction with the signal inverter and amplifier of Figs. 1 and 2. As previously mentioned, the output of the two cells must be balanced or correctly proportioned when copy background is being scanned. To secure this balance or proportion of intensities we provide novel means for controlling the brilliance of the beam of light between the lamp 300 and the photocell 113.

In Fig. 3 the balancing photocell 113 receives a portion of the exciter beam 306 by means of reflectors 312 and 313, which represent any practical means for diverting a beam of light 314 to cell 113. In the path of beam 314 we insert an adjustable polarizing device 315, which in this instance comprises a pair of axially aligned disks 316 and 317. The disk 316 is fixed on a rotary shaft 318 so as to be radially adjustable by turning a knob 319 on the shaft. The other disk 317 is mounted on a fixed support 320 and remains stationary, the shaft 318 passing loosely through the disk. The physical structure of the disks 316 and 317 is such that they polarize the light passing through them. It will not be necessary to describe the composition of this polarizing material, for it can be obtained in the market under various trade names.

When the disks 316 and 317 are arranged with their polarizing axes parallel, as indicated at 321, they form a transparent unit and transmit the beam 314 to cell 113 with substantially undiminished intensity. By turning the disk 316, however, the intensity of the transmitted beam is diminished to a degree depending upon the angle of adjustment of the disk. When the axes of the two disks are at right angles to each other, the polarizer cuts off practically all light from the photocell 113. In this simple way the amount of light needed for the balancing cell 113 in its relation to the signal cell 105 can be regulated to a nicety.

Figure 4:
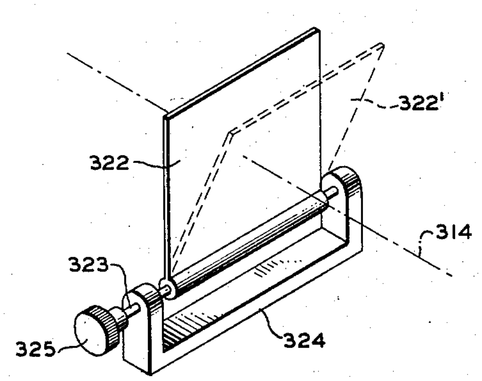

Another form of polarizer suitable for use in connection with cell 113 is shown in Fig. 4, where a small plate 322 is mounted on a rotary shaft 323 which is supported in a suitable frame or bracket 324 and is operated by a knob 325. The internal structure of the plate 322 is such that it is fully transparent to a beam of light that strikes it at right angles. However, when the plate is tilted in relation to the beam, as indicated at 322', the intensity of the transmitted beam is reduced to a degree depending upon the angular adjustment of the plate. Therefore, by merely turning the knob 325 through the proper angle the correct amount or intensity of light will reach the balancing photocell 113.

Figure 5:
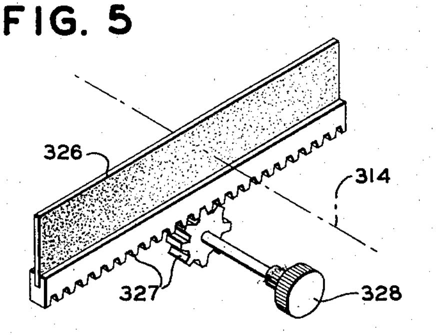
Figs. 4, 5 and 6 show three forms of optical regulators for the balancing photocell.
Figure 6:
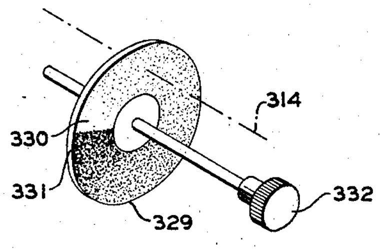

In some cases we may use a light wedge instead of a polarizer to adjust the light for the photocell 113. Two forms of such light wedges are shown in Figs. 5 and 6. In Fig. 5, a strip of film 326 is slidably mounted in the path of the beam 314. This film has a surface of progressively varying transparency, being clear at one end and opaque at the other, as indicated by the stippling. A rack and pinion connection 327 operated by a knob 328 represents any practical form of slidable adjustment for the strip 326. By moving this strip to the proper position, the intensity of the light beam for cell 113 is accurately adjusted. In Fig. 6 the light wedge 329 is in the form of a rotary film disk with progressively varying transparency from clear at 330 to opaque at 331. A knob 332 permits adjustment of the disk through the required angle. Otherwise what has been said for Fig. 5 applies to Fig. 6.

It will be apparent that the optical control devices in Figs. 3 to 6 are each characterized by having a light transmitting medium of varying degrees of transparency. By adjusting the position of this medium in the path of beam 314, the intensity of the beam can be regulated with such precision that the output of the balancing cell 113 will match that of the signal cell 105 for the optimum trainsmission of facsimile signals. This optical adjustment for the photocell 113 is independent of the particular type of exciter lamp used.

While we have shown and described certain specific embodiments of the various features of our optical scanning system, it is to be understood that the drawings and description are merely illustrative of our invention and not a restriction or limitation thereof. Nor is it necessary that all the novel features of our invention shall be employed in the same system, for it is evident that some features may be used without others. It is to be expected that in the commercial practice of our invention changes and modifications will be resorted to within the scope of the appended claims.

This application is a division of our copending case Serial No. 676,180, filed June 12, 1946, which matured to Patent No. 2,567,307 on September 11, 1951, from which the subject matter of the present case was officially required to be divided out.

We claim as our invention:

1. In an optical scanning system for facsimile transmitters, wherein black message copy is scanned, a source of pulsating light provided by an A. C. source representing carrier frequency, a photocell subjected to said pulsating light as modulated by a scanned record, a second photocell exposed directly to said pulsating light and operating in phase with the first photocell, a light transmitting device interposed between said source of light and the second photocell, said device comprising a light wedge of progressively varying transparency being transparent at one end and opaque at the other, means to adjust the position of said device to regulate the intensity of the beam transmitted to the second photocell, means for connecting said photocells in a bridge circuit, means for so conditioning said bridge circuit that excitation of the two photocells during the scanning of white copy background produces no change in potential across the bridge, an amplifier means, means for connecting said amplifier means across the bridge so that variations in the excitation of the first photocell during the scanning of marked areas on the copy produce corresponding changes in potential across the bridge whereby the resultant inverted signals pass to said amplifying tube, biasing means connected to said amplifier means, said biasing means including a third photocell exposed to said source of light whereby the amplifier bias compensates for variations of said light source.

2. In an optical scanning system for facsimile transmitters, a source of pulsating light provided by an A. C. source representing carrier frequency, a photocell exposed to said pulsating light as modulated by a scanned record, a second photocell directly exposed to said pulsating light, a light transmitting device interposed between said source of light and the second photocell, said device comprising a light wedge of progressively varying transparency being transparent at one end and opaque at the other, means to adjust the position of said device to regulate the intensity of the beam transmitted to the second photocell, means for connecting the two photocells in the branches of a bridge circuit, a pair of vacuum tubes connected in push-pull arrangement across said bridge, a condenser in the connection between the grid of each tube and the corresponding side of the bridge, means for impressing a fixed negative bias on the grid of each tube so as to balance the tubes when copy background is being scanned, said condensers passing the alternating current signal voltage to said grids when the excitation of the first photocell is diminished in the scanning of dark areas on copy, whereby the balance of the tubes is upset, a transformer connected in the plate circuit of said pair of tubes, amplifier means including a third vacuum tube connected to the secondary of said transformer, biasing means connected to the grid of said third tube, said biasing means including a third photocell expose to said source of light whereby the grid bias of the third tube compensates for variations of said light source.

References Cited in the file of this patent

UNITED STATES PATENTS

| | | |
|---|---|---|
| 1,985,044 | Lyle | Dec. 18, 1934 |
| 2,041,079 | Lyle | May 19, 1936 |
| 2,086,865 | Gustafson | July 13, 1937 |
| 2,278,920 | Evans et al. | Apr. 7, 1942 |
| 2,319,898 | Zurian | May 25, 1943 |
| 2,358,103 | Ryder | Sept. 12, 1944 |
| 2,408,023 | Kruper | Sept. 24, 1946 |
| 2,459,293 | Shonnard | Jan. 18, 1949 |
| 2,524,651 | Cooley | Oct. 3, 1950 |

OTHER REFERENCES

Walker: "Photoelectric Cells In Industry," Pitman Pub. Corp., New York, received in the U. S. Patent Office Scientific Library, Oct. 3, 1949 (page 429, and pages 90 and 91, relied upon).